W. T. LOGAN.
Horse-Rake.

No. 220,296. Patented Oct. 7, 1879.

Attest:
George S. Parker
Chas. Hadaway

Inventor:
William T. Logan,
by G. H. W. J. Howard
Attorneys

UNITED STATES PATENT OFFICE.

WILLIAM T. LOGAN, OF CAMP ELKWATER, WEST VIRGINIA.

IMPROVEMENT IN HORSE-RAKES.

Specification forming part of Letters Patent No. 220,296, dated October 7, 1879; application filed March 19, 1879.

*To all whom it may concern:*

Be it known that I, WILLIAM T. LOGAN, of Camp Elkwater, in the county of Randolph and State of West Virginia, have invented certain new and useful Improvements in Horse-Rakes, of which the following is a specification, reference being had to the accompanying drawings, and to the letters of reference marked thereon.

The invention relates to that class of horse-rakes which are used for agricultural purposes, in which the rake is lifted and dropped by the driver for dumping the collected load of hay, grain, &c., and combines with a rake of said class a shock-bearer for facilitating the transfer of the shock to the desired locality. Other features of novelty in the construction and arrangement of the various parts of the machine are hereinafter particularly described.

Figure 1:
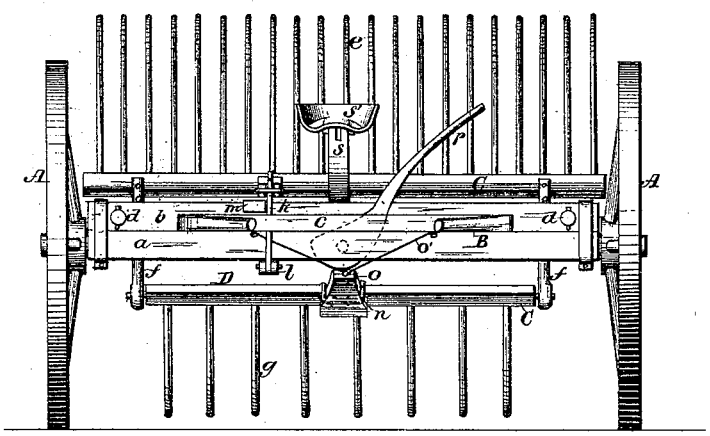
Figure 2:
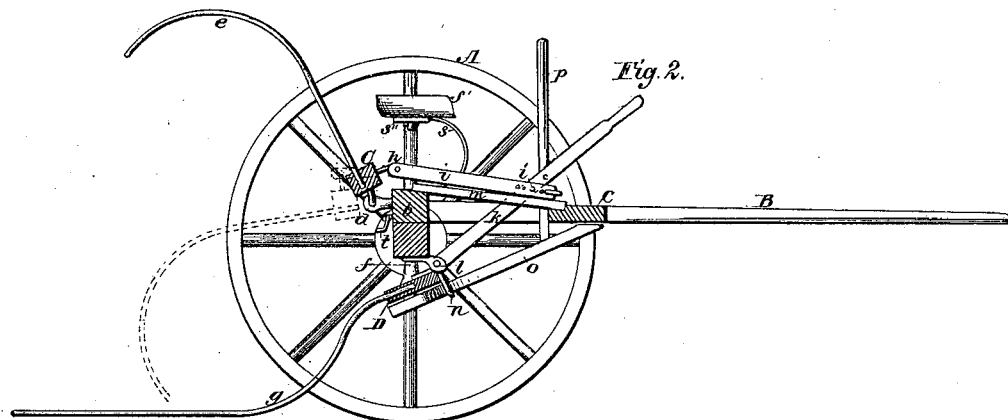
Figure 3:
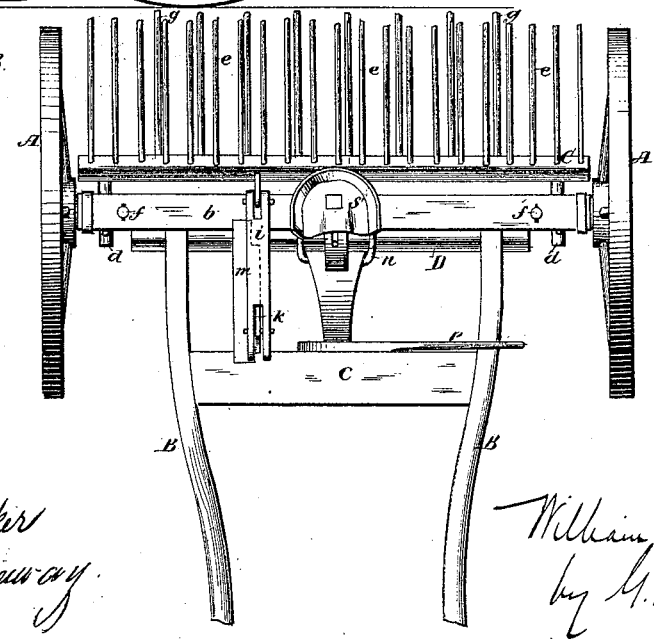

In the accompanying drawings, Figure 1 is a front view, Fig. 2 a longitudinal section, and Fig. 3 a plan, of the invention.

The axle of the machine is made in two parts, $a$ and $b$, of wood, which are suitably bolted and banded together. The wheels A, to which I prefer to give wooden hubs, are somewhat dished, as shown, to give them greater strength. The shafts B extend from the upper section of the axle, and are provided with a cross-bar, $c$. At each end of the said section of the axle is an iron eyebolt, $d$, to which bolts is suspended the rake-head C, having the rake-teeth $e$. A similar eyebolt, $f$, passes through both sections of the axle near the two ends thereof, and sustains the head D of the shock-bearer, to which prongs $g$ are fitted, so as to pass between and clear the rake-teeth. The eyebolts $f$ are made adjustable vertically in their bearings, whereby the shock-bearer prongs, in their depressed or lowest position, may be adjusted with reference to the height of the horse. It will be understood that both the rake and shock-bearer heads are held by their respective eyebolts in a manner which allows them to have a free vertical swinging movement. To the top of the rake-head C is attached a pin or bolt, $h$, to which a link, $i$, having a series of holes, is secured, which link is operated to effect the raising of the rake-teeth by means of a lever, $k$, having a fulcrum at $l$ on the lower section of the axle. A notched board, $m$, which extends between the upper section of the axle and the cross-bar $c$, and is secured thereto, is used to catch the lever $k$ and hold it and its attendant parts when the lever is fitted to the notch, as will be readily understood. To the under side of the shock-bearer head, and hinged or pivoted thereto by the strap $n$, is a foot-board, $o$, adapted to move longitudinally of the machine. This movement, which may be given by the feet of the driver, is aided by the cam-lever $p$, which, when brought to a vertical position, bears on the front end of said foot-board, and has the effect of raising the shock-bearer prongs to an approximate vertical position. The front end of the foot-board $o$ is supported by cords $o'$, fastened to the under side of the cross-bar $c$. The seat, which is sustained by the top section of the axle, is adapted to slide longitudinally of the machine, the standard $s$, upon which the seat $s'$ rests, being slotted, as shown, in which slot the pin $s''$, holding the seat, is movable.

The operation of the machine is as follows: The hay, &c., is first raked in a windrow, the shock-bearer prongs being raised for the purpose and hooked up by means of the hook $t$, depending from the upper section of the axle. The machine is driven over the field, the rake resting on the surface, and being under the control of the driver through the medium of the lever $k$. The windrow having been formed, the shock-bearer prongs are let down, and the rake lifted and held up by hooking the lever $k$ into the notched board $m$, as before explained. The horse is then backed, and the shock-bearer prongs inserted under the shock. The shock-bearer is then raised by means of the cam-lever and foot-board, and the rake let down, when the shock is clamped, and the machine prepared to move forward. When the locality at which the load is to be dumped or deposited is reached, the shock-bearer is let down and the rake raised, and the forward movement of the machine carries the shock-bearer from under the shock, which is left on the earth.

Should it be desired to rake and distribute shocks by the use of the rake only, the shock-bearer may be permanently elevated, when the driver would let fall and raise the rake in the ordinary way.

The weight of the driver may be thrown forward, when shocks are being carried, by sliding the seat forward.

The sectional axle admits of ready repair in the event of breakage.

Having described my invention, I claim as new and wish to secure by Letters Patent of the United States—

1. The combination, in a horse-rake, of rake-teeth $e$ and shock-bearers $g$ in their respective heads C and D, and constructed to have a free vertical swinging movement, substantially as specified.

2. The combination in a horse-rake of a swinging shock-bearer, a foot-board hinged thereto, and a cam-lever for elevating said shock-bearer by bearing on said foot-board, as specified.

In testimony whereof I have hereunto subscribed my name.

WILLIAM T. LOGAN.

Witnesses:
 WM. J. MOORE,
 CORNEALIUS M. WOOD.